(No Model.)
L. T. GIBBS.
COMPRESSED AIR ENGINE.
No. 592,246. Patented Oct. 26, 1897.
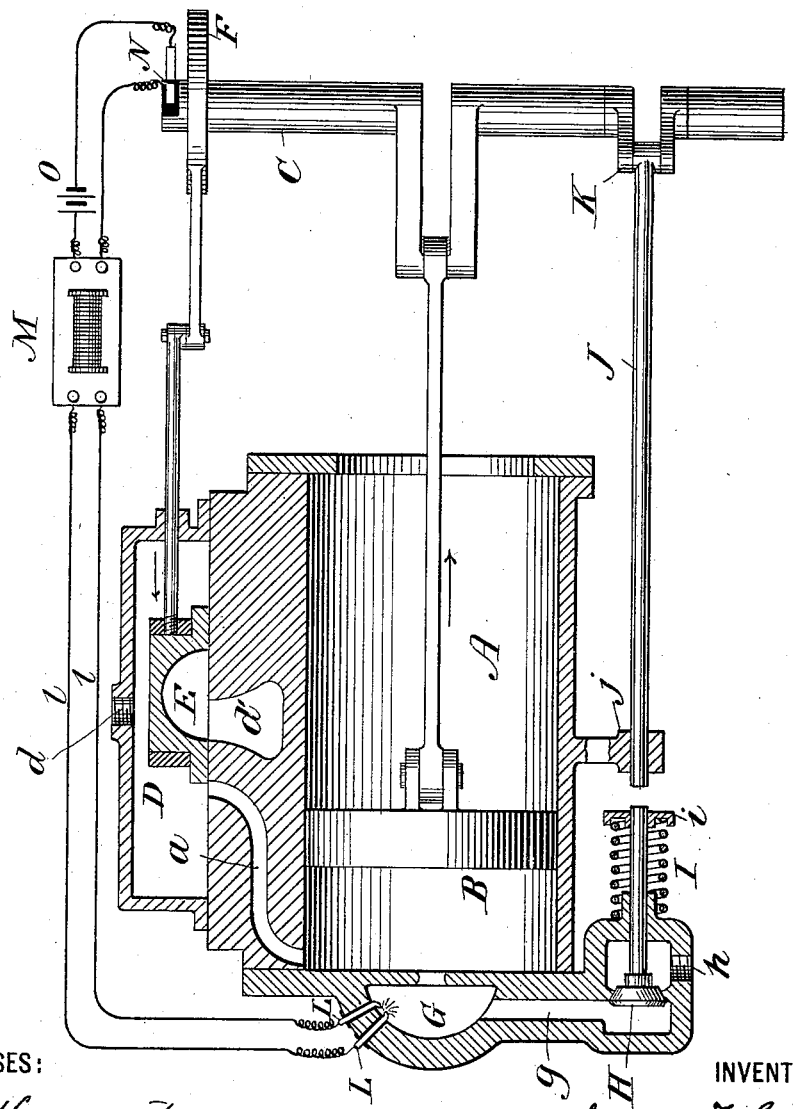
WITNESSES:
INVENTOR
Lucius T. Gibbs
BY Park Benjamin
his ATTORNEY

UNITED STATES PATENT OFFICE.

LUCIUS T. GIBBS, OF NEW YORK, N. Y.

COMPRESSED-AIR ENGINE.

SPECIFICATION forming part of Letters Patent No. 592,246, dated October 26, 1897.

Application filed April 8, 1897. Serial No. 631,276. (No model.)

*To all whom it may concern:*

Be it known that I, LUCIUS T. GIBBS, of the city, county, and State of New York, have invented a new and useful Improvement in Compressed-Air Engines, of which the following is a specification.

My invention consists in an engine wherein the working fluid is composed of two different gases or vapors, one of which enters into the working cylinder at a lower pressure than the other. One of these gases is an inflammable gas which enters at relatively lower pressure into the cylinder than the other gas, which is air-compressed by external means to such a degree that the working energy of the motor is chiefly stored therein and derived therefrom, and hence said air is primarily the source of power in the motor. Said air, however, is cut off before the piston has completed its stroke, so that subsequently the expansion of the air supplies the motive energy. As a consequence of such expansion, while performing work, the temperature of the air becomes reduced, and, as is well known, often to such a degree as to cause freezing of the contained moisture at the exhaust-port, besides other disadvantageous results. I compensate for this loss of heat by igniting and burning in the working air within the cylinder of the motor a definite quantity of inflammable gas or vapor which enters singly into the cylinder when the pressure therein is at or about that of the atmosphere, so that said air, despite its expansion, is finally emitted at the exhaust at a temperature considerably above the freezing-point of water. This results in a cycle of operations which has not hitherto been performed, so far as I know, in any engine. This cycle may be described as follows, the motor for purposes of illustration being assumed to be single-acting:

First. Gas is admitted into the cylinder when the pressure therein is substantially that of the atmosphere. Hence in the beginning and with the engine at rest the gas is allowed to enter a chamber opening into the cylinder behind the piston before compressed air is admitted to the cylinder to start the piston on its forward stroke, and subsequently when the engine is in motion gas is admitted to said chamber just before the beginning of the backward or exhaust stroke or during the continuance of said exhaust-stroke.

Second. The working air under pressure then enters behind the piston for a part of the stroke and is cut off and permitted to expand over the rest of the stroke.

Third. At or about the time of cut-off of said air the gas already in the cylinder having become mixed with said air is ignited, and thus the temperature of the working fluid in the cylinder is increased and its pressure incidentally augmented.

It will be observed from this cycle that the cylinder is not charged with air and gas both at atmospheric pressure, nor with air and gas both under compression, nor with air and gas entering together with or without previous mixing in a reservoir outside of the cylinder.

It is also to be observed that the compression of the air is not caused by the motor itself, but is effected entirely by extraneous means. The power of the motor depends, therefore, upon the work previously done upon the air in order to compress it. The degree of compression is not simply that required to bring the whole volume of inflammable mixture into the motor or cylinder prior to ignition, so that power may subsequently be obtained by igniting the gas therein while the volume remains stationary and the pressure increased, as in certain well-known forms of gas-engines, but it is sufficient to actuate the motor to do useful work against the load. An engine can itself compress its own air in sufficient degree for the first-named purpose, but no mechanism can compress its own air and simultaneously drive itself by the energy thus stored.

The accompanying drawing is a diagrammatic sectional representation of an engine or motor constructed and arranged in accordance with my invention.

A is the working cylinder, B the piston, and C the crank-shaft.

D is the valve-chest, communicating with one end of the cylinder by a passage $a$, with the atmosphere by an exhaust-port $d'$, and with any suitable source of compressed air by the opening $d$.

E is a slide-valve operated by a crank or eccentric F on the shaft C and arranged to control the admission of compressed air to the cylinder through the inlet-port $a$ and its discharge from the cylinder through the exhaust-port $d'$. The timing of the valve is such that the compressed air is admitted to the cylinder at the beginning of the working stroke and cut off at a predetermined point and allowed to exhaust at or near the end of the stroke.

G is the combustion-chamber, which may be conveniently formed in the cylinder-head and communicates through an opening with the interior of the cylinder. The chamber G communicates by a passage $g$ with the chamber of the valve H, which chamber has a connection at $h$ with a source of inflammable gas. The valve-stem projects through the case and has at its outer end a disk $i$, between which and the end of the valve-case is a spiral spring I, tending to close the valve and hold it to its seat.

On the shaft C is an eccentric or crank K, to which is connected the valve-operating rod J. This rod passes through a bearing $j$ in line with the stem of valve H, which valve H it is adapted to open and to hold open for a short interval when the pressure within the cylinder has fallen to or about to atmospheric pressure.

L L are spark-points projecting into the combustion-chamber G and connected by the wires $l$ $l$ of an electric circuit through an induction-coil M and a contact-maker N with a battery O or other convenient source of electricity. The contact-maker N is operated by the crank-shaft C, so as to close the circuit and produce a spark at the points L L in the combustion-chamber preferably at or near the instant of cut-off of the air in the working stroke of the engine.

The operation of the engine whereby it performs the cycle before described is as follows: The parts being in the position shown in the drawing, the piston B and valve-rod J moving to the right and the air-valve E to the left, as indicated by arrows, compressed air is admitted from the valve-chamber D through passage $a$ into the cylinder of the piston B, moving it forward. At the proper point in the working stroke of the piston the valve E closes the passage $a$ and cuts off the supply of compressed air to the cylinder, after which the air operates expansively upon the piston during the remainder of the working stroke. Preferably at or near the point of cut-off the contact-maker N closes the electric circuit $l$ $l$ through the induction-coil M and battery O, producing a spark at the points L L in combustion-chamber G. The charge of inflammable gas or vapor which is contained in said chamber under pressure mingled with sufficient air to render it explosive is thereby ignited and exploded and the heat thus liberated is imparted to the compressed air in the cylinder at or about the time it begins to expand and lose its heat.

At or near the end of the forward or working stroke or during the return stroke of the piston the valve-rod J opens the valve H and a fresh charge of gas or vapor is forced into the combustion-chamber G. At this time the pressure in the cylinder behind the piston is reduced to or nearly to that of the atmosphere, and very little extra pressure is required to inject the gas or vapor into the combustion-chamber. As the piston completes its forward stroke the air-valve E brings the passage $a$ into communication with the exhaust-port $d'$ and the return stroke of the piston expels the spent charge of air and gas from the cylinder. When it reaches the limit of its return movement, the valve E again opens the passage $a$, admitting air under pressure to the cylinder, and the piston is again forced forward, as above explained. A portion of the compressed air thus admitted to the cylinder mingles with the gas or vapor contained in the combustion-chamber G, producing an explosive mixture which will be readily ignited when the electric current is closed and a spark produced. The combustion-chamber G preferably communicates with the cylinder through a contracted opening and is formed opposite said opening with a conical surface which focuses at or near a point in said opening, thereby tending when an explosion occurs to force the heated gas through said opening and spread it in the cylinder in radiating lines diverging from said opening.

The heat produced within the cylinder by the admission of the gas is directly applied to and absorbed by the air. Thus the temperature of the air is elevated with the expenditure of the least possible fuel or energy. The force developed by the explosion of the gas is incidentally utilized to aid the air in driving the piston, but its primary object is to maintain or raise the temperature of the air during expansion, the compressed air being, as I have said, the primary or main motive power or agent.

I have illustrated my invention here as embodied in a single-acting engine, but it is obvious that the same cycle may be performed in a double-acting engine.

Among the advantages secured by my invention are the following:

As the gas enters the chamber at a low pressure, approximately that of the atmosphere, and not in a compressed state, the amount of it which is utilized per stroke is very small, and, indeed, need be only enough to produce sufficient warming of the air. The quantity of gas to be stored and carried in vehicles, for example, propelled by my engine is therefore far less than is necessary where gas is the principal source of power. Of course the amount of gas expended per stroke is very much less than in any engine of equal capacity wherein exploding gas is the chief motive agent. The economy in gas consumption is therefore obvious.

As the gas is not forced into the compressed air in the working cylinder, there is no necessity for previously bringing it to high pressure. Therefore no auxiliary gas-compressing device is required and the expense and losses incident to compressing the gas separately from the air are avoided.

As the gas is not mixed with the air to produce an explosive mixture prior to entering the cylinder, the dangers incident to compressing air and gas together and keeping and handling reservoirs charged with such explosive mixture are wholly avoided.

As the gas does not enter the cylinder at the same pressure as and with the air, but at a much lower pressure, there is no danger of explosions in the conduits or passages outside of the cylinder. So, also, no attention need be paid to the adjustment of specific proportions of gas and air to produce an ignitible mixture in the cylinder. I find by actual practice that these are substantially self-adjusting, an efficient explosion always occurring despite the apparently very small proportion of gas present in the air and the variations in air-pressure.

I claim—

1. The combination in a compressed-air engine of a cylinder provided with an inlet and an exhaust port for the admission and exit of the working fluid, a valve controlling said ports, a piston in said cylinder, a gas-chamber opening into one end of said cylinder and communicating with a source of gas-supply, a valve controlling the admission of gas to said chamber, and an igniter in said chamber; the aforesaid parts being constructed, timed, and operating to admit air under pressure to actuate the piston over a part of the working stroke, then to cut off said air to cause said air to work expansively, to admit gas into said chamber when the pressure in said chamber shall have fallen substantially to that of the atmosphere and subsequently to ignite said gas, substantially as described.

2. The combination in a compressed-air engine of a cylinder provided with inlet and exhaust ports for the admission and exit of the working fluid, a valve controlling said ports, a piston in said cylinder, a source of gas-supply also communicating with said cylinder, a valve controlling said gas and means for exploding the gas in said cylinder, the aforesaid parts being constructed, timed, and operating to admit air under pressure to actuate said piston over a part of the working stroke, then to cut off said air to cause said air to work expansively, to admit gas into said cylinder when the pressure therein shall have fallen substantially to that of the atmosphere, and subsequently to ignite said gas, substantially as described.

3. The combination in a compressed-air engine of a cylinder provided with inlet and exhaust ports for the admission and exit of the working fluid, a slide-valve controlling said ports, a piston in said cylinder, a source of gas-supply also communicating with said cylinder, a valve controlling said gas, means for exploding said gas in said cylinder, a main shaft actuated by said piston, and mechanism whereby said shaft is caused to actuate said slide-valve, said gas-valve, and said igniter; the aforesaid parts operating to admit air under pressure to actuate said piston over a part of the working stroke, then to cut off said air to cause said air to work expansively, to admit gas into said cylinder when the pressure therein shall have fallen substantially to that of the atmosphere, and subsequently to ignite said gas, substantially as described.

4. The combination of a motor, a source of air under working pressure, a valve controlling the admission of the same to the motor, a valve admitting inflammable gas, and an igniter, the parts being so organized and timed that an explosion will occur at the point of cut-off of the working air, substantially as described.

LUCIUS T. GIBBS.

Witnesses:
H. R. MOLLER,
I. A. VAN WART.